INDUCTANCE TUNING UNIT

Filed Aug. 5, 1949

INVENTORS
FRANK O. CHESUS
JOHN T. KOLEDA
BY
Mock & Blum
ATTORNEYS

Patented Feb. 24, 1953

2,629,860

UNITED STATES PATENT OFFICE 2,629,860

INDUCTANCE TUNING UNIT

Frank O. Chesus, Bayshore, and John T. Koleda, Islip, N. Y.

Application August 5, 1949, Serial No. 108,734

6 Claims. (Cl. 336—79)

This invention relates to a device for tuning circuits used in the transmission and reception of radio frequency waves, by varying the inductance of these circuits.

This invention is a continuation-in-part of our previous United States application Serial No. 48,268, entitled "Variable Inductance" and filed September 8, 1948, now abandoned.

Our invention is useful in conjunction with receivers of waves in the television and frequency modulation bands, but is not limited to these bands.

Our device comprises a series of flat, or ribbon, spiral wound coils which are mounted on fixed vertical forms and are respectively connected in various variable tuned circuits in the receiver. We mount a turnable shaft transversely to these coil forms and further mount a plurality of copper plates on this shaft so that the plates are proximate to the respective faces of each coil.

These plates are so shaped that when the shaft is turned, the area of the plates opposing the respective faces of the coils may be varied between a minimum and a maximum. Since the effective inductance of each of the coils depends on the area of plate opposing each face thereof, it is possible by turning the shaft to tune the receiver through a predetermined range of frequencies.

We may control the rate at which the inductance of each coil changes as the shaft is turned by the manner in which we construct the coils, space the plates from the coils and shape the plates, and by various other means. As a result, we can control the frequency distribution of the tuning dial and thus, for example, can prevent crowding of stations on the dial at the high frequency end of the band. We also find it possible to cover a wide range of frequencies on any one band.

The turning of the plates to oppose the face of the coils causes an increase in the capacity of the various circuits. We can regulate this increase in capacity by the manner in which we construct the coils, space the plates from the coils and shape the plates, and also by certain circuit arrangements. In these circuit arrangements, we can ground the coils and keep the plates above ground, or else we can ground the plates and keep the coils above ground.

We find it possible, by applying the methods described above, to control the inductance and capacity variation of the various circuits as the tuning dial turns, so that substantially constant band pass may be obtained over the desired range of frequencies.

Our device is simple mechanically. There are no mechanical contacts, such as wipers, to complete any circuits. The proper frequency variation can be obtained with relatively few turns of the tuning knob. The device is compact, has high mechanical stability and is economical and easy to construct.

Other objects and advantages of the invention will become apparent in the following description and in the annexed drawings, in which preferred embodiments are disclosed.

Figure 2:
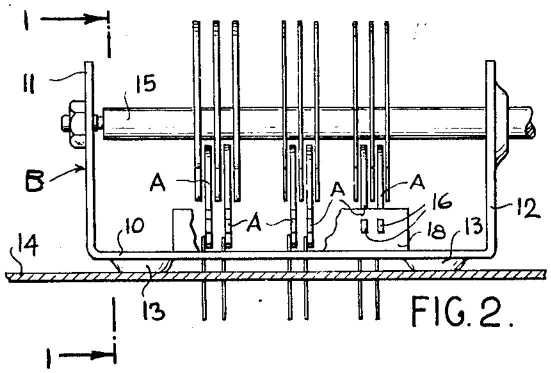
Fig. 2 is a side elevation, partly broken away, of our improved tuning device.

As is shown in Fig. 2, our improved tuning unit is mounted on a supporting frame B, which has a bottom wall 10 and end walls 11 and 12. This bottom wall 10 rests on a plurality of cups or shock absorbers 13, which are adapted to be secured to a support wall 14, which is a part of the chassis on which the tuning unit is mounted. The various tubes and circuit elements mounted on wall 14 are not shown in Fig. 2.

We mount a plurality of coil forms A on frame base 10, and we place a plurality of plates P on a shaft 15 which is turnably mounted on end walls 11 and 12. These forms A and plates P may be arranged in a variety of ways, one of which is shown in Fig. 2. Fig. 2 shows plates P divided into three groups of three, and forms A on either side of the respective center plates P in each of said groups.

If desired, each group of coils thus formed may correspond to a different stage of the receiver, and within each group each coil may correspond to a different frequency band.

Coil forms A are preferably made of a plastic such as Bakelite, or of other suitable insulating material. We prefer to form them with side extensions 16 and with a depending leg 17.

Figure 1:
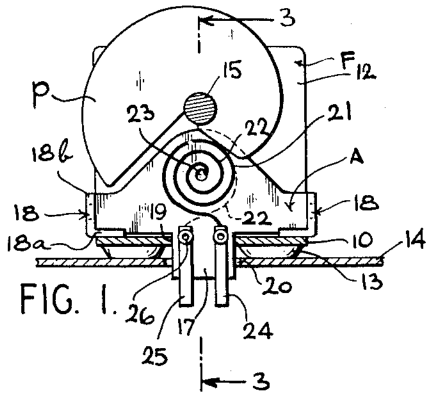
Fig. 1 is a section on line 1—1 of Fig. 2.

In order to mount forms A, we prefer to provide L-shaped brackets 18, which are clearly shown in Fig. 1. These brackets 18 have base members 18a which are mounted on frame base 10 and also have upstanding parallel arms 18b. We mount each form A transversely to arms 18b and with respective arms 16 extending through suitable apertures in the respective arms 18b. Optionally, any suitable securing means may be employed.

When forms A are so mounted, the respective legs 17 of these forms A extend through a suitable longitudinal recess 19 in base member 10 and a suitable longitudinal recess 20 in member 14. Optionally, the legs 17 may be friction-fitted in said recess 19.

We prefer to construct coils F by applying suitable metallic paint to the respective forms A. We apply the material to each side of the respective forms A so as to form coil sections 21 and 22 on the respective sides of each form A. These coil sections 21 and 22 are respectively in the shape of a spiral, as is clearly shown in Fig. 1, and the inner termini of these spirals are respectively adjacent a hole 23 in each form A. We apply the metallic paint on the sides of the respective holes 23 so as to connect the inner termini of the coil sections 21 and 22. The coils F respectively consist of a coil section 21 and a section 22 in series.

The outer termini of these coils 21 and 22 are respectively connected to terminal lugs 24 and 25. The upper ends of these lugs 24 and 25 may be attached to form A by means of rivets 26, and these lugs extend below form leg 17. Suitable connecting wires may be connected to the lower ends of the respective lugs 24 and 25, to connect coils F in circuits.

Optionally, instead of painting coils on forms A, holes of relatively large diameter may be cut in the respective forms A and conventional wire coils mounted therein. Regardless of the type of construction, however, we prefer to use a flat, spiral-wound coil, because we prefer to space plates P quite close to forms A; and this is only possible if we limit the thickness of forms A together with their associated coils.

Plates P may be fixedly mounted on shaft 15 by any convenient means. While we are not limited to any one shape of these plates 15, we find it desirable for most purposes to give them a shape substantially as shown in Fig. 1. Fig. 1 is drawn approximately to the same size and shape as an actual tuning unit which we employ. In this view, plate P is shown in a position corresponding to the tuning unit being tuned to the lowest frequency of the particular band in use. As plate P is turned so that its surface opposes coils 21, the frequency tuning unit is tuned to higher frequency.

Plate P is preferably made of copper or a similar non-magnetic but highly conductive metal. However, for low frequencies, we have found it desirable for some purposes to make plates P partly of a ferromagnetic material, such as iron.

Shaft 15 may be turnably mounted in walls 11 and 12 in any convenient manner. One end of this shaft 15 may be connected to a suitable tuning dial which may be coupled by any convenient means to a tuning knob.

The operation of this device depends upon the fact that when the coils F are connected in suitable tuning circuits, the turning of plates P varies the effective inductance of these respective coils F. When one considers the plate P together with coil section 21, shown for example in Fig. 1, it is seen that as plate P is turned so that its surface is opposite coil 21, plate P acts as the equivalent of a single-turn shorted secondary coil. By transformer action, a portion of the electro-magnetic field of coil 21 causes a current in the plate P. This is equivalent to lowering the inductance of coil 21, and by lowering this inductance it is possible to increase the resonant frequency of the circuit in which the coil 21 is connected.

Figure 4:
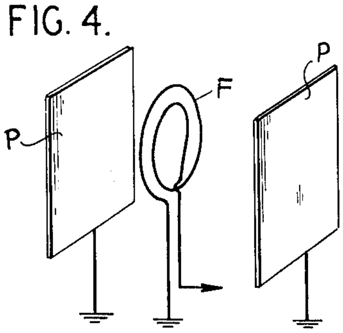
Fig. 4 shows in diagrammatic form a coil and its two associated inductance tuning plates, and shows same in one circuit arrangement.
Figure 5:
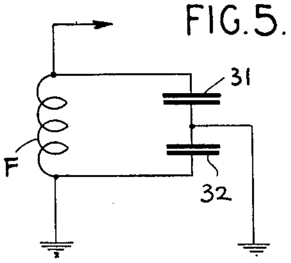
Fig. 5 is a diagram of the circuit corresponding to Fig. 4.
Figure 3:
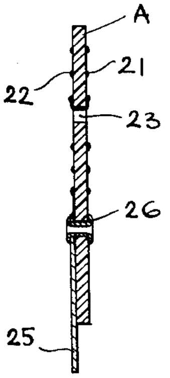
Fig. 3 is a section on line 3—3 of Fig. 1.

In addition, the varying of the position of plate P causes a variation in the capacity of the circuit, as shown in Figs. 4 and 5. Fig. 4 shows schematically a coil F with its associated tuning plates P. There is a capacity between each of these plates P and each turn of coil F, and the resulting equivalent capacities are shown diagrammatically in Fig. 5. As shown in Fig. 5, coil F is in series with two capacities 31 and 32, where capacity 31 results from the presence of one plate P, and capacity 32 results from the presence of the other plate P. Grounding plates P, as in Fig. 4, is equivalent to grounding the connection between capacities 31 and 32 in Fig. 5. The values of capacities 31 and 32 are dependent upon the angular position of plate P.

We can vary the physical characteristics of the parts of our device so as to produce the desired circuit inductance and capacity for any angular position of plate P. For example, we may wish to have the inductance decrease at such a rate, when plate P is turned from its position of Fig. 1, that the resonant frequency varies approximately linearly with the angular position of plate P and there is no crowding of stations on the tuning dial at the high frequency end of the band.

As a further example, we may wish to have the circuit capacity vary with the circuit inductance in such a way that the band-pass is approximately uniform at all frequencies in the band.

We control the variation of and the effect of variation of circuit inductance and capacity in several ways. We can vary the initial inductance and capacity of the circuit, apart from that contributed by coil F and plates P. We can vary the number of turns of coil F, the spacing of plates P from coil F, the size and shape of plates P, and various other factors.

In addition, we can control the effect of distributed capacities 31 and 32 by the manner in which we connect coil F and plates P in circuit. In the construction of Figs. 4 and 5, plates P and one side of coil F are grounded. As a result, capacity 32 is shorted out, and the distributed capacity in circuit has the value of capacity 31.

Particularly at higher frequencies, even when the physical characteristics of the device are carefully adjusted, the distributed capacity sometimes increases too rapidly in proportion to the decrease in inductance as plate P is turned from its position of Fig. 1, to maintain constant band-pass. We may then replace the circuit arrangement of Figs. 4 and 5 by that of Figs. 6 and 7, in which plates P are kept above ground. Since neither capacity 31 nor 32 is shorted out, the total distributed capacity in circuit is less than the value of either capacity 31 or 32.

Figure 6:
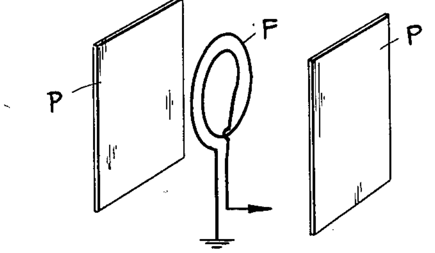
Fig. 6 is a view similar to Fig. 4, but showing the parts in a second circuit arrangement.
Figure 7:
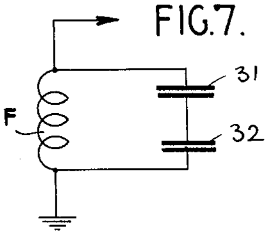
Fig. 7 is a diagram of the circuit corresponding to Fig. 6.

Another advantage of the construction of Figs. 6 and 7 is that no wiper contacts are needed between turnable shaft 15 and the chassis. This reduces noise. In this construction, we prefer to use a suitably insulated shaft 15.

Figure 8:
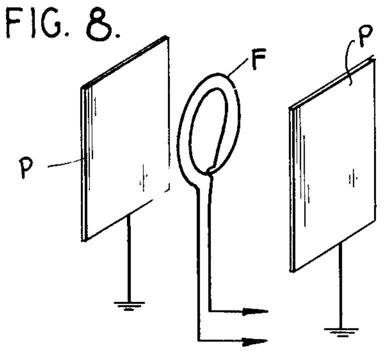
Fig. 8 is a view similar to Fig. 4, but showing the parts in a third circuit arrangement.
Figure 9:
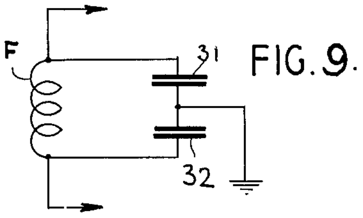
Fig. 9 is a diagram of the circuit corresponding to Fig. 8.

In the construction of Figs. 8 and 9, plates P are grounded, but coil F is kept above ground. As in the construction of Figs. 8 and 9, the total distributed capacity in circuit is thereby reduced. Optionally, the center of coil F may be grounded.

Optionally, both plates P and coil F can be kept above ground.

The dimensions of the parts used in our improved tuner may vary depending upon the particular circuits in which the coils are being used, upon the frequency range, and upon the physical spacing of the other parts associated with the tuning unit. As one example, when plate P and coil forms A are connected in the circuit of Figs. 8 and 9 and are employed in the tank circuit of a receiver oscillator tube, and for a set having an intermediate frequency of 22 megacycles and for an oscillator range of 80 to 110 megacycles, the tuning plate P and coil forms A may have approximately the dimensions shown in Fig. 1. Coil form A may have a thickness of approximately $\frac{1}{16}$ of an inch, although this is not critical. However, this dimension is quite large as compared to the spacing between plates P and form A. The respective coils 21 and 22 may have a thickness of $\frac{3}{1000}$ of an inch. The spacing between the plate P and the form A may be approximately $\frac{4}{100}$ of an inch. However, this dimension will vary considerably depending upon the lead inductance from the coil to the tube to which it is connected, and this dimension may be as high as $\frac{8}{100}$ of an inch. It is preferred that the thickness of the coil used be small in comparison with the spacing between the associated plate P and said coil.

The thickness of plates P is not critical and will ordinarily be determined by conventional mechanical and electrical design considerations. We have found it preferable to make the plates of the oscillator stage thick enough to shield the rest of the receiver from the electromagnetic field of the oscillator coils.

We have disclosed certain modifications which may be made in our invention, and numerous other changes, omissions and additions may be made in the invention without departing from the scope and spirit thereof.

We claim:

1. A variable inductance tuning device comprising a frame having a ground, a plate-like insulating form which has an aperture and which is supported by said frame, a coil comprising flat spiral wound coil sections which are respectively mounted on the respective faces of said form and which have respective inner terminal ends which are positioned adjacent said aperture, connecting means which extends through said aperture and electrically connects said inner ends of said coil sections, a pair of conductive plates which are mounted on said frame substantially parallel to said form, means for moving said plates in a direction parallel to said form and for varying the area of each plate which directly opposes the proximate face of said coil, one only of the elements including said pair of plates and the respective termini of said coil being electrically connected to said ground.

2. A device in accordance with claim 1, in which said plates are grounded and said coil is kept above ground.

3. A device in accordance with claim 1, in which said plates are kept above ground and said coil is grounded.

4. A variable inductance tuning device comprising a frame having a longitudinal axis and a ground, a plate-like insulating form which has an aperture and which is supported by said frame, said form extending laterally and transversely, a coil comprising flat coil sections which are respectively mounted on the respective faces of said form and which have respective inner terminal ends which are positioned adjacent said aperture, connecting means which extends through said aperture and electrically connects said inner ends of said coil sections, a longitudinal shaft rotatably mounted on said frame and having its axis offset from said form and extending forwardly and rearwardly of said form, said plates being so shaped that the areas of said plates respectively directly opposing the respective proximate coil sections vary in substantial unison between a maximum and minimum during rotation of said shaft through a selected angular distance, one only of the pair of elements comprising said plates and the pair of elements comprising the free termini of said coil being electrically connected to said ground.

5. A device in accordance with claim 4, in which said plates are the pair of elements which are grounded.

6. A device in accordance with claim 4, in which said free termini of said coil are the pair of elements which are grounded.

FRANK O. CHESUS.
JOHN T. KOLEDA.

REFERENCES CITED

The following references are of record in the file of this patent:

UNITED STATES PATENTS

| Number | Name | Date |
|---|---|---|
| 1,558,473 | Gordon | Oct. 27, 1925 |
| 1,571,405 | Goldsmith | Feb. 2, 1926 |
| 1,934,722 | Lesh | Nov. 14, 1933 |
| 2,001,235 | Aurynger | May 14, 1935 |
| 2,341,345 | Van Billiard | Feb. 8, 1944 |
| 2,473,705 | George | June 21, 1949 |

FOREIGN PATENTS

| Number | Country | Date |
|---|---|---|
| 309,894 | Germany | Dec. 21, 1918 |